United States Patent
Wu et al.

(10) Patent No.: US 10,602,192 B2
(45) Date of Patent: Mar. 24, 2020

(54) METHODS AND APPARATUSES FOR PERFORMING ENTROPY ENCODING AND ENTROPY DECODING WITH SIZE DETERMINATION OF AT LEAST ONE BITSTREAM PORTION

(71) Applicant: MEDIATEK INC., Hsin-Chu (TW)

(72) Inventors: Tung-Hsing Wu, Chiayi (TW); Li-Heng Chen, Tainan (TW); Han-Liang Chou, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 324 days.

(21) Appl. No.: 15/422,484

(22) Filed: Feb. 2, 2017

(65) Prior Publication Data

US 2017/0230691 A1    Aug. 10, 2017

Related U.S. Application Data

(60) Provisional application No. 62/291,041, filed on Feb. 4, 2016.

(51) Int. Cl.
*H04N 7/12* (2006.01)
*H04N 19/91* (2014.01)

(52) U.S. Cl.
CPC .................... *H04N 19/91* (2014.11)

(58) Field of Classification Search
CPC ...... H03M 7/4018; H03M 7/40; H04N 19/13; H04N 19/176; H04N 19/70; H04N 19/91; B60H 1/00828

USPC .......... 375/240.26, 240.25, 240.02
See application file for complete search history.

(56) References Cited

U.S. PATENT DOCUMENTS

| 2006/0257034 A1* | 11/2006 | Gish ............... H04N 19/61 382/239 |
| 2007/0019876 A1* | 1/2007 | Cai ............... H04N 19/647 382/240 |
| 2010/0117875 A1* | 5/2010 | Oslick ............... H03M 7/40 341/59 |
| 2011/0248873 A1* | 10/2011 | Karczewicz ............ H03M 7/46 341/67 |
| 2012/0121024 A1* | 5/2012 | Lee ............... H04N 19/13 375/240.26 |
| 2012/0140814 A1* | 6/2012 | Sole Rojals ........ H03M 7/4018 375/240.02 |
| 2014/0286417 A1* | 9/2014 | Gamei ............... H03M 7/4018 375/240.12 |
| 2015/0016542 A1* | 1/2015 | Rosewarne .......... H04N 19/176 375/240.25 |

(Continued)

*Primary Examiner* — Gim S Philippe
(74) *Attorney, Agent, or Firm* — Winston Hsu

(57) ABSTRACT

An entropy encoder includes an entropy encoding circuit and a size determining circuit. The entropy encoding circuit receives symbols of a pixel group, and entropy encodes data derived from the symbols of the pixel group to generate a bitstream segment which is composed of a first bitstream portion and a second bitstream portion. The first bitstream portion contains encoded magnitude data of the symbols of the pixel group, and the second bitstream portion contains encoded sign data of at least a portion of the symbols of the pixel group. The size determining circuit determines a size of a bitstream portion, wherein the bitstream portion comprises at least one of the first bitstream portion and the second bitstream portion.

32 Claims, 5 Drawing Sheets

(56) References Cited

U.S. PATENT DOCUMENTS

| | | | |
|---|---|---|---|
| 2015/0063443 A1* | 3/2015 | Matsumura | H04N 19/147 375/240.03 |
| 2015/0264362 A1* | 9/2015 | Joshi | H04N 19/18 375/240.18 |
| 2018/0007366 A1* | 1/2018 | Wang | H04N 19/70 |

* cited by examiner

METHODS AND APPARATUSES FOR PERFORMING ENTROPY ENCODING AND ENTROPY DECODING WITH SIZE DETERMINATION OF AT LEAST ONE BITSTREAM PORTION

CROSS REFERENCE TO RELATED APPLICATIONS

This application claims the benefit of U.S. provisional application No. 62/291,041, filed on Feb. 4, 2016 and incorporated herein by reference.

BACKGROUND

The disclosed embodiments of the present invention relate to entropy encoding and decoding, and more particularly, to methods and apparatuses for performing entropy encoding and entropy decoding with size determination of at least one bitstream portion (e.g., a bitstream portion used to carry encoded sign data).

In general, the video decoder performance is usually bounded by entropy decoding performance. One conventional video coding technique is to partition one frame into multiple slices and encode each of the slices independently. In this way, each of the encoded slices can be independently decodable at the video decoder. For example, the video encoder may be configured to have multiple entropy encoding units used to generate different bitstream segments separately, and the video decoder may be configured to have multiple entropy decoding units for parallel entropy decoding of different bitstream segments included in an encoded bitstream transmitted from the video encoder. Regarding the video encoder, there is a need for knowing bitstream positions of bitstream segments for combining the bitstream segments to form the encoded bitstream. Regarding the video decoder, there is a need for knowing bitstream positions of bitstream segments for extracting the bitstream segments from the encoded bitstream.

SUMMARY

In accordance with exemplary embodiments of the present invention, methods and apparatuses for performing entropy encoding and entropy decoding with size determination of at least one bitstream portion (e.g., a bitstream portion used to carry encoded sign data) are proposed to solve the above-mentioned problem.

According to a first aspect of the present invention, an exemplary entropy encoder is disclosed. The exemplary entropy encoder includes an entropy encoding circuit and a size determining circuit. The entropy encoding circuit is arranged to receive symbols of a pixel group, and entropy encode data derived from the symbols of the pixel group to generate a bitstream segment which is composed of a first bitstream portion and a second bitstream portion, wherein the first bitstream portion contains encoded magnitude data of the symbols of the pixel group, and the second bitstream portion contains encoded sign data of at least a portion of the symbols of the pixel group. The size determining circuit is arranged to determine a size of a bitstream portion, wherein the bitstream portion comprises at least one of the first bitstream portion and the second bitstream portion.

According to a second aspect of the present invention, an exemplary entropy decoder is disclosed. The exemplary entropy decoder includes an entropy decoding circuit and a size determining circuit. The entropy decoding circuit is arranged to receive a bitstream segment composed of a first bitstream portion and a second bitstream portion, and entropy decode the bitstream segment to obtain decoded data of symbols of a pixel group, wherein the first bitstream portion contains encoded magnitude data of the symbols of the pixel group, and the second bitstream portion contains encoded sign data of at least a portion of the symbols of the pixel group. The size determining circuit is arranged to determine a size of a bitstream portion, wherein the bitstream portion comprises at least one of the first bitstream portion and the second bitstream portion.

According to a third aspect of the present invention, an exemplary entropy encoding method is disclosed. The exemplary entropy encoding method includes: receiving symbols of a pixel group; entropy encoding data derived from the symbols of the pixel group to generate a bitstream segment which is composed of a first bitstream portion and a second bitstream portion, wherein the first bitstream portion contains encoded magnitude data of the symbols of the pixel group, and the second bitstream portion contains encoded sign data of at least a portion of the symbols of the pixel group; and determining a size of a bitstream portion, wherein the bitstream portion comprises at least one of the first bitstream portion and the second bitstream portion.

According to a fourth aspect of the present invention, an exemplary entropy decoding method is disclosed. The exemplary entropy decoding method includes: receiving a bitstream segment composed of a first bitstream portion and a second bitstream portion; determining a size of a bitstream portion, wherein the bitstream portion comprises at least one of the first bitstream portion and the second bitstream portion; and entropy decoding the bitstream segment to obtain decoded data of symbols of a pixel group, wherein the first bitstream portion contains encoded magnitude data of the symbols of the pixel group, and the second bitstream portion contains encoded sign data of at least a portion of the symbols of the pixel group.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
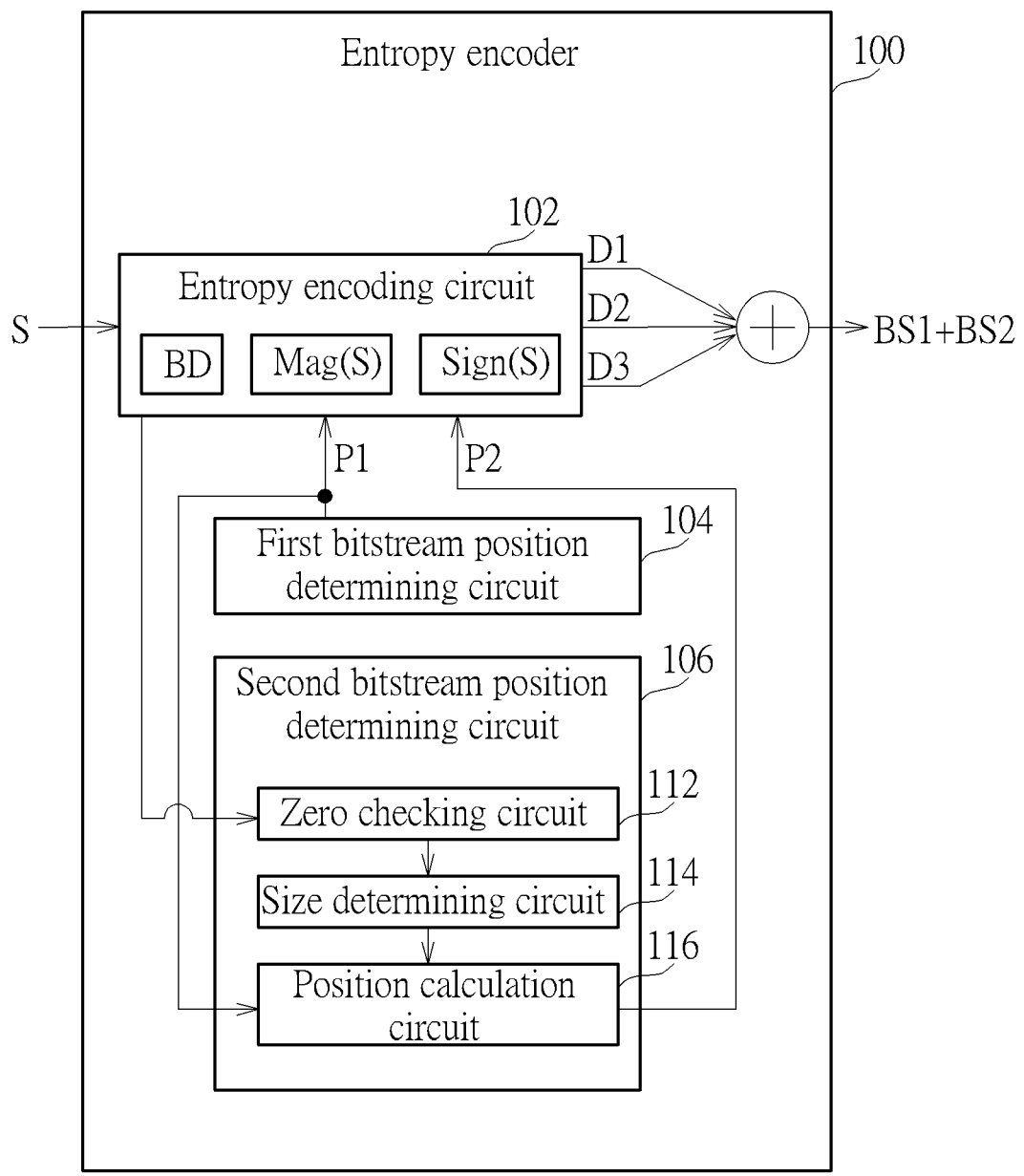
FIG. 1 is a block diagram illustrating an exemplary entropy encoder according to an embodiment of the present invention.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

The present invention proposes applying entropy encoding to magnitude data of symbols (e.g., absolute values of prediction residual, absolute values of quantized prediction residual, or absolute values of quantized transform coefficients) and sign data of the symbols separately to thereby generate a first bitstream portion and a second bitstream portion that are concatenated to form a final bitstream segment, wherein the first bitstream portion contains encoded magnitude data of the symbols and the second bitstream portion contains encoded sign data of the symbols. In the following specification description, the term "symbol" may mean any data to be entropy encoded by an entropy encoder. For example, a symbol is associated with or corresponds to the residual, such as a quantized prediction residual under an advanced display stream compression (A-DSC) block prediction mode or a quantized transform coefficient under an A-DSC transform mode. For another example, a symbol is a quantized transform coefficient under an A-DSC transfer mode. Since the magnitude data and the sign data of the symbols are entropy encoded separately, a sign data removal technique can be employed to shorten the final bitstream segment by reducing the size of the second bitstream portion. For example, when a symbol value has zero magnitude, the magnitude data of the symbol value is encoded to be part of the first bitstream portion, while the sign data of the symbol value is not presented in the second bitstream portion.

One image may include one or more slices, one slice may include one or more blocks, and one block may include one or more pixel groups. By way of example, but not limitation, a compression algorithm with a fixed compression ratio may be employed to entropy encode each slice, such that the size of each compressed slice is constrained by the fixed compression ratio. Consider a case where a 2×2 pixel group includes 4 pixels and the symbols of the 2×2 pixel group include 4 symbol values {3, 0, 5, −20}. Hence, the magnitude data (i.e., absolute values) of the symbol values {3, 0, 5, −20} are {3, 0, 5, 20}, and the sign data of the symbol values {3, 0, 5, 20} are {+, +, +, −}. The maximum bit-depth needed for presenting each of the symbol values {3, 0, 5, 20} in binary notation is 5. Hence, each of the absolute values {3, 0, 5, 20} is entropy encoded with the maximum bit-depth, such that the size of encoded magnitude data of each symbol value is equal to the same maximum bit-depth. For example, the entropy encoding result of the magnitude data {3, 0, 5, 20} may be {00011, 00000, 00101, 10100}. Hence, the first bitstream portion includes "00011 00000 00101 10100".

The entropy encoding of the sign data {+, +, +, −} uses one bit for representing the sign data of one symbol value, and uses sign data removal to remove sign data of any symbol value with zero magnitude. For example, the positive sign {+} is represented by "0", and the negative sign {−} is represented by "1". Since the second symbol value {0} has zero magnitude, the sign data of the second symbol value {0} is not included in the second bitstream portion. Hence, the second bitstream portion includes "0 0 1". The first bitstream portion and the second bitstream portion are concatenated to form the final bitstream segment "00011 00000 00101 10100 0 0 1". In addition, the maximum bit-depth information {5} may be encoded and signaled in the final bitstream segment. For example, the first bitstream portion further includes the encoded maximum bit-depth information preceding the encoded magnitude data of the symbols.

As mentioned above, entropy encoding of the magnitude data and entropy encoding of the sign data can be performed separately, and the first bitstream portion and the second bitstream portion are combined to form a final bitstream segment for carrying information corresponding to the symbols of one pixel group. Hence, the entropy encoder may need to know an end position of the first bitstream portion in the final bitstream segment to correctly append the second bitstream portion to the first bitstream portion, and may also need to know an end position of the second bitstream portion (i.e., an end position of the final bitstream segment of the current pixel group) to append the first bitstream portion of the next pixel group to the second bitstream portion of the current pixel group.

The entropy decoder may be configured to perform entropy decoding of encoded magnitude data and entropy decoding of encoded sign data separately. Hence, the entropy decoder may need to know an end position of the first bitstream portion in the final bitstream segment to separate the first bitstream portion from the second bitstream portion. In addition, the entropy decoder may be configured to perform entropy decoding of a bitstream segment of one pixel group and entropy decoding of a bitstream segment of another pixel group in a parallel manner. Hence, the entropy decoder may need to know an end position of the second bitstream portion (i.e., an end position of a current bitstream segment) to quickly find the first bitstream portion of a next bitstream segment.

Further details of the proposed entropy encoder design and entropy decoder design are described as below.

FIG. 1 is a block diagram illustrating an exemplary entropy encoder according to an embodiment of the present invention. By way of example, but not limitation, the entropy encoder 100 may be employed by an advanced display stream compression (A-DSC) encoder. In this embodiment, the entropy encoding performed by the entropy encoder 100 supports the aforementioned sign data removal functionality. As shown in FIG. 1, the entropy encoder 100 includes an entropy encoding circuit 102, a first bitstream position determining circuit 104 and a second bitstream position determining circuit 106. The entropy encoding circuit 102 is a core part of the entropy encoder 100, and is arranged to receive symbols S of a pixel group (e.g., prediction residual, quantized prediction residue or quantized transform coefficients of a 2×2 pixel group), and entropy encode data derived from the symbols S of the pixel group to generate a bitstream segment which is composed of a first bitstream portion BS1 and a second bitstream portion BS2. The entropy encoding circuit 102 determines a bit-depth value BD associated with entropy encoding of magnitude data Mag(S) of the symbols S of the pixel group, wherein the magnitude data Mag(S) include magnitude values (i.e., absolute values) of all symbol values of the symbols S of the pixel group. For example, the bit-depth value BD may be set by the maximum bit-depth needed to present each magnitude value of the magnitude data Mag(S) in binary notation. When sign data removal is enabled due to at least one symbol value of the symbols S of the pixel group has a zero magnitude value, the sign data Sign(S) to be entropy encoded do not include the sign value of the at least one symbol value with zero magnitude. When sign data removal is not enabled due to none of the symbol values of the symbols S of the pixel group has a zero magnitude value, the sign data Sign(S) to be entropy encoded include sign values of all symbol values of the symbols S of the pixel group.

The entropy encoding circuit 102 performs entropy encoding upon the bit-depth value BD, the magnitude data Mag(S) and the sign data Sign(S) to generate the corresponding encoded bit-depth value D1, encoded magnitude data D2 and encoded sign data D3, respectively, wherein the encoded bit-depth value D1, the encoded magnitude data D2 and the encoded sign data D3 may be concatenated to form the bitstream segment composed of the first bitstream portion BS1 and the second bitstream portion BS2. In this embodiment, the encoded bit-depth value D1 and the encoded magnitude data D2 may be combined to form the first bitstream portion BS1, and the encoded sign data D3 may be output as the second bitstream portion BS2. In other words, the first bitstream portion BS1 contains encoded magnitude data of the symbols S of the pixel group, and the second bitstream portion BS2 contains encoded sign data of at least a portion (i.e., part or all) of the symbols S of the pixel group.

The first bitstream position determining circuit 104 is arranged to calculate a first bitstream position P1 according to at least the bit-depth value BD determined by the entropy encoding circuit 102, wherein the first bitstream position P1 indicates a position of an end of the first bitstream portion BS1 in the bitstream segment. The pixel group (e.g., 2×2 pixel group) has a plurality of pixels (e.g., 4 pixels), and the symbols S of the pixel group has a plurality of symbol values of the pixels, respectively. In this embodiment, the bit-depth value BD is set by the maximum bit-depth needed to present each magnitude value (absolute value) of the magnitude data Mag(S) in binary notation. Hence, a bit-depth of an encoded magnitude value of each of the symbol values is equal to the bit-depth value BD. The first bitstream position determining circuit 104 can calculate the first bitstream position P1 according to at least a product of the bit-depth value BD and the number of pixels included in the pixel group. It should be noted that the number of pixels included in the pixel group is same as the number of encoded magnitude values generated for the pixel group.

The second bitstream position determining circuit 106 includes a zero checking circuit 112, a size determining circuit 114, and a position calculation circuit 116. The zero checking circuit 112 is arranged to perform zero value checking upon magnitude values of the symbol values to generate a plurality of zero value checking results, respectively. For example, when a symbol value has a non-zero magnitude value (i.e., when an absolute value of the symbol value is larger than zero), a corresponding zero value checking result is set by a first value (e.g., "1"), and when the symbol value has a zero magnitude value (i.e., when the absolute value of the symbol value is equal to zero), the corresponding zero value checking result is set by a second value (e.g., "0"). As mentioned above, entropy encoding of the sign data uses one bit for representing a sign value of one symbol value with non-zero magnitude, and a sign value of any symbol value with zero magnitude is not encoded into the second bitstream portion BS2. Hence, the size determining circuit 114 can determine the size of the second bitstream portion BS2 according to the zero value checking results provided by the zero checking circuit 112. For example, the second bitstream portion BS2 only includes bits each being set to represent the sign value of one symbol value with non-zero magnitude, such that the size of the second bitstream portion BS2 is equal to the number of symbol values with non-zero magnitude. Since the number of symbol values with non-zero magnitude is indicated by first values (e.g., "1") included in the zero value checking results, the size determining circuit 114 can set the size of the second bitstream portion BS2 by the number of first values (e.g., "1") included in the zero value checking results.

In this embodiment, the bitstream segment is generated by combining the first bitstream portion BS1 and the second bitstream portion BS2. For example, an end of the first bitstream portion BS1 is immediately followed by a start of the second bitstream portion BS2. As mentioned above, the first bitstream position P1 calculated by the first bitstream position determining circuit 104 indicates the end position of the first bitstream portion BS1 in the bitstream segment, and the size of the second bitstream portion BS2 is obtained by the size determining circuit 114. The position calculation circuit 116 is arranged to calculate a second bitstream position P2 according to the first bitstream position P1 and the size of the second bitstream portion BS2. For example, the second bitstream position P2 is set by a sum of the first bitstream position P1 and the size of the second bitstream portion BS2. The second bitstream position P2 indicates a position of an end of the second bitstream portion BS2 in the bitstream segment. It should be noted that an end of the second bitstream portion BS2 is also an end of the bitstream segment.

The entropy encoding circuit 102 may perform entropy encoding upon the magnitude data Mag(S) (which include all magnitude values of the symbols S of the pixel group) and perform entropy encoding upon the sign data Sign(S) (which include sign data of at least a portion of the symbols S of the pixel group) separately. The first bitstream position P1 calculated by the first bitstream position determining circuit 104 and the second bitstream position P2 calculated by the second bitstream position determining circuit 106 are both provided to the entropy encoding circuit 102. In this way, the entropy encoding circuit 102 may refer to the first bitstream position P1 (which indicates an end position of the first bitstream portion BS1 in the bitstream segment) to correctly append the second bitstream portion BS2 (i.e., encoded sign data D3) to the first bitstream portion BS1 (which includes at least the encoded magnitude data D2), and can further refer to the second bitstream position P2 (which indicates an end position of the second bitstream portion BS2) to append the first bitstream portion of the next pixel group to the bitstream segment of the current pixel group.

The aforementioned use of the first bitstream position P1 and the second bitstream position P2 is for illustrative purposes only, and is not meant to be a limitation of the present invention. In practice, any entropy encoder design using the proposed bitstream position determination scheme to calculate bitstream position(s) (e.g., P1 and/or P2) falls within the scope of the present invention.

Figure 2:
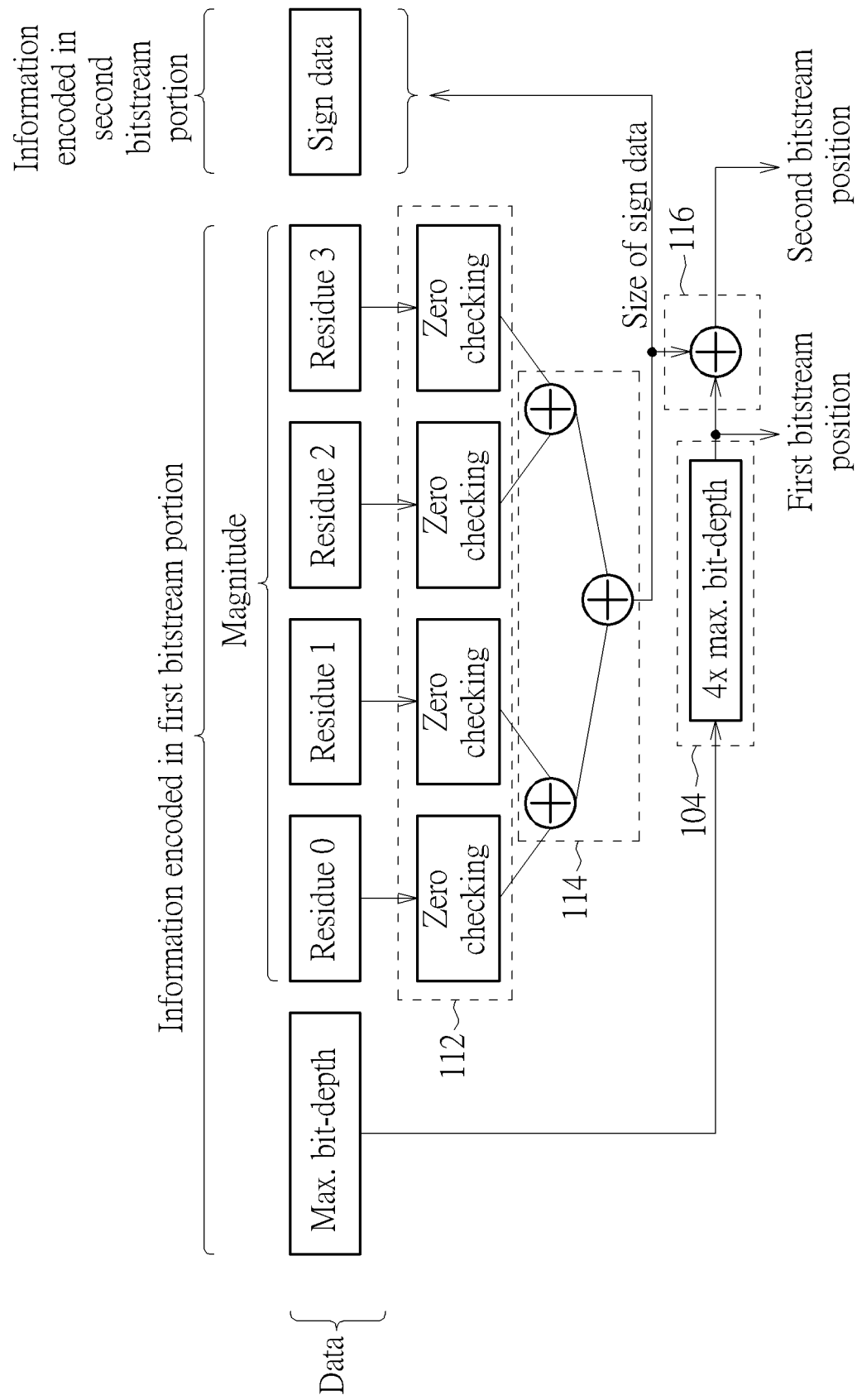
FIG. 2 is a diagram illustrating an exemplary circuit design of a first bitstream position determining circuit, a zero checking circuit, a size determining circuit and a position calculation circuit shown in FIG. 1 according to an embodiment of the present invention.

FIG. 2 is a diagram illustrating an exemplary circuit design of the first bitstream position determining circuit 104, the zero checking circuit 112, the size determining circuit 114 and the position calculation circuit 116 shown in FIG. 1 according to an embodiment of the present invention. In this example, one pixel group has four pixels. Hence, the magnitude data of the pixel group includes four magnitude values (absolute values) denoted by "Residue 0", "Residue 1", "Residue 2", "Residue 3". The sign data to be entropy encoded includes sign value(s) of non-zero symbol value(s) only due to the proposed sign data removal. The size of the encoded magnitude value of each symbol in a pixel group is constrained by the maximum bit-depth. Hence, the first bitstream position determining circuit 104 may be implemented using a multiplier which is arranged to multiply the maximum bit-depth value and the number of pixels included in the pixel group (which is equal to the number of encoded magnitude values (encoded absolute values) each having the same maximum bit-depth). The zero checking circuit 112 may be implemented using zero checking units (denoted by "zero checking") for generating zero checking results of the magnitude values (absolute values). The size determining circuit 114 may be implemented using adders for summing up the zero checking results to determine the size of the second bitstream portion (which is equal to the number of non-zero symbol values). The position calculation circuit 116 may be implemented using an adder to determine the second bitstream position by summing up the size of the second bitstream portion and the first bitstream position. It should be noted that the circuit implementation shown in FIG. 2 is for illustrative purposes only, and is not meant to be a limitation of the present invention.

Figure 3:
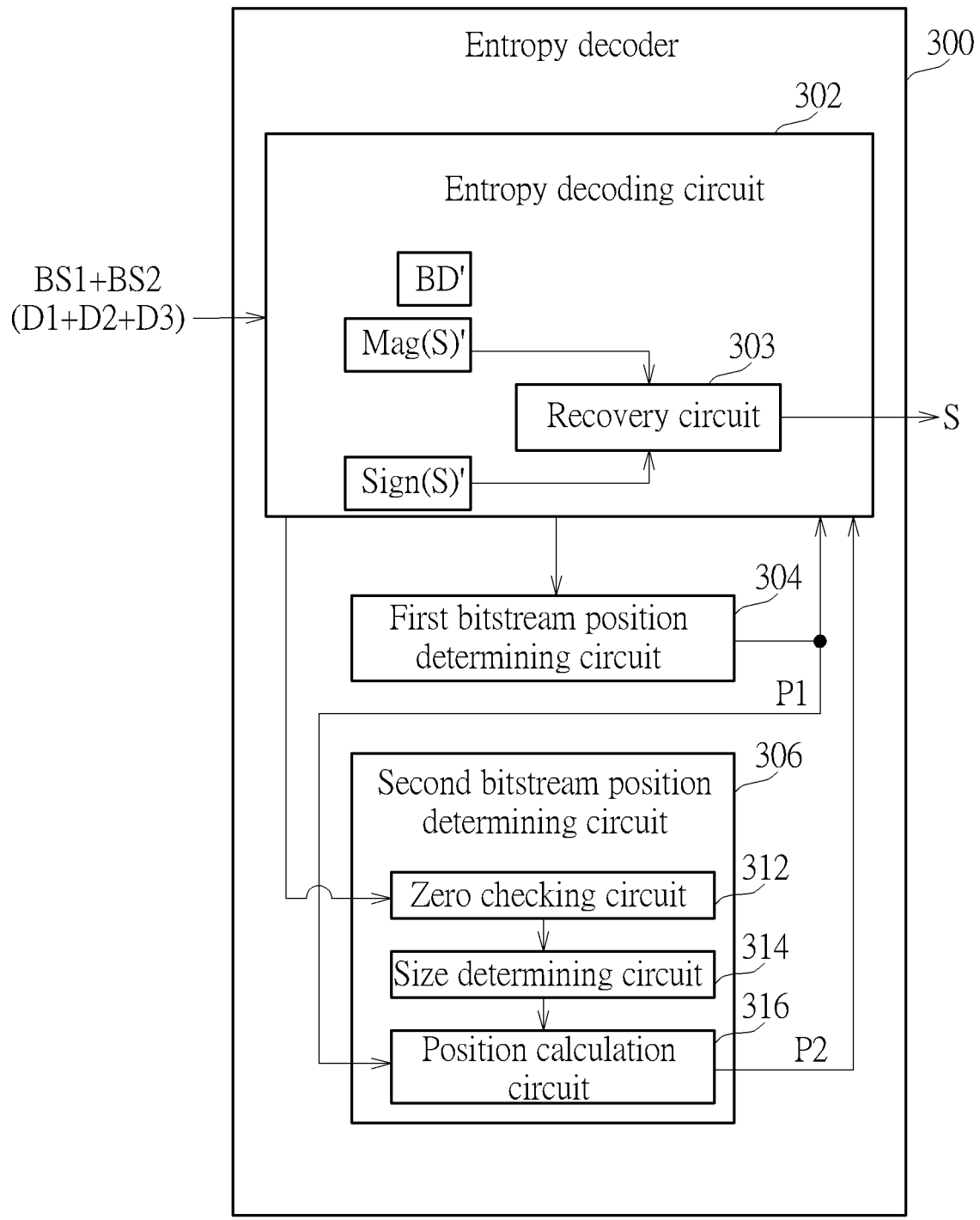
FIG. 3 is a block diagram illustrating an exemplary entropy decoder according to an embodiment of the present invention.

FIG. 3 is a block diagram illustrating an exemplary entropy decoder according to an embodiment of the present invention. By way of example, but not limitation, the entropy decoder 300 may be employed by an advanced display stream compression (A-DSC) decoder. In this embodiment, the entropy decoder 300 is used to entropy decode the bitstream segment (which is composed of first bitstream portion BS1 and second bitstream portion BS2) generated from the entropy encoder 100 shown in FIG. 1. As shown in FIG. 3, the entropy decoder 300 includes an entropy decoding circuit 302, a first bitstream position determining circuit 304 and a second bitstream position determining circuit 306. The entropy decoding circuit 302 is a core part of the entropy decoder 300, and is equipped with the functionality to recover the removed sign data when the entropy encoding performed by the entropy encoder 100 supports the proposed sign data removal functionality. The entropy decoding circuit 302 is arranged to receive the bitstream segment composed of the first bitstream portion BS1 (which includes encoded bit-depth value D1 and encoded magnitude data D2) and the second bitstream portion BS2 (which includes encoded sign data D3), and entropy decode the bitstream segment to obtain decoded data of symbols S of a pixel group (e.g., a 2×2 pixel group). Specifically, the first bitstream portion BS1 contains encoded magnitude data of the symbols S of the pixel group, and the second bitstream portion BS2 contains encoded sign data of at least a portion (i.e., part or all) of the symbols S of the pixel group.

The entropy decoding circuit 302 entropy decodes the encoded bit-depth value D1 included in the first bitstream portion BS1 to obtain decoded bit-depth value BD' associated with entropy decoding of the encoded magnitude data D2. For example, the decoded bit-depth value BD' is the maximum bit-depth which indicates the size of the encoded magnitude data of each symbol value. The decoded bit-depth value BD' can be used for entropy decoding the encoded magnitude data D2, and can also be used for determining the first bitstream position P1. Further details are described as below.

After the decoded bit-depth value BD' is available, the entropy decoding circuit 302 obtains decoded magnitude data Mag(S)' by entropy decoding the encoded magnitude data D2 according to the decoded bit-depth value BD'. In addition, the entropy decoding circuit 302 further obtains decoded sign data Sign(S)' by entropy decoding the encoded sign data D3. When sign data removal is enabled at the entropy encoder 100 due to the fact that at least one zero symbol value is possessed by the symbols S of the pixel group, the decoded sign data Sign(S)' do not include the sign value of the at least one zero symbol value. When sign data removal is not enabled at the entropy encoder 100 due to the fact that all symbol values possessed by the symbols S of the pixel group have non-zero magnitude, the decoded sign data Sign(S)' include the sign values of all non-zero symbol values possessed by the symbols S of the pixel group.

The decoded magnitude data Mag(S)' and the decoded sign data Sign(S)' are processed by a recovery circuit 303 to recover the decoded data of the residue S of the pixel group. Regarding a decoded non-zero magnitude value of a symbol value, the associated sign value of the symbol value is obtained from the decoded sign data Sign(S)'. Regarding a decoded zero magnitude value of a symbol value, the associated sign value of the symbol value is not presented in the decoded sign data Sign(S)', and is directly set by a pre-defined sign value.

Moreover, after the decoded bit-depth value BD' is available, the first bitstream position determining circuit 304 is operative to calculate the first bitstream position P1 according to at least the decoded bit-depth value BD', wherein the first bitstream position P1 indicates a position of an end of the first bitstream portion BS1 in the bitstream segment. The pixel group (e.g., 2×2 pixel group) has a plurality of pixels (e.g., 4 pixels), and the symbols S of the pixel group have a plurality of symbol values of the pixels, respectively. A bit-depth of an encoded magnitude value of each of the symbol values is equal to the decoded bit-depth value BD (which is the maximum bit-depth that controls the size of the encoded magnitude value of each symbol). The first bitstream position determining circuit 304 can calculate the first bitstream position P1 according to at least a product of the decoded bit-depth value BD and the number of the pixels included in the pixel group (which is equal to the number of encoded magnitude values in the first bitstream portion BS1).

The second bitstream position determining circuit 306 includes a zero checking circuit 312, a size determining circuit 314, and a position calculation circuit 316. The zero checking circuit 312 is arranged to perform zero value checking upon encoded magnitude values of the symbol values to generate a plurality of zero value checking results, respectively. For example, when an encoded magnitude value of a symbol value has a non-zero value, a corresponding zero value checking result is set by a first value (e.g., "1"), and when the encoded magnitude value of the symbol value has a zero value, the corresponding zero value checking result is set by a second value (e.g., "0"). As mentioned above, entropy encoding of the sign data uses one bit for representing a sign value of one symbol value with non-zero magnitude, and a sign value of any symbol value with zero magnitude is not presented in the second bitstream portion BS2. Hence, the size determining circuit 314 can determine the size of the second bitstream portion BS2 according to the zero value checking results provided by the zero checking circuit 312. For example, the second bitstream portion BS2 only includes bits each being set to represent the sign value of one symbol value with non-zero magnitude, such that the size of the second bitstream portion BS2 is equal to the number of non-zero encoded magnitude values. It should be noted that entropy encoding of one non-zero magnitude value generates one non-zero encoded magnitude value, and entropy encoding of one zero magnitude value generates one zero encoded magnitude value. Since the number of non-zero encoded magnitude values is indicated by first values (e.g., "1") included in the zero value checking results, the size determining circuit 314 can set the size of the second bitstream portion BS2 by the number of first values (e.g., "1") included in the zero value checking results.

As mentioned above, the bitstream segment is generated by concatenating the first bitstream portion BS1 and the second bitstream portion BS2. The first bitstream position P1 calculated by the first bitstream position determining circuit 304 indicates the end position of the first bitstream portion BS1 in the bitstream segment, and the size of the second bitstream portion BS2 is obtained by the size determining circuit 314. The position calculation circuit 316 is arranged to calculate a second bitstream position P2 according to the first bitstream position P1 and the size of the second bitstream portion BS2. For example, the second bitstream position P2 is set by a sum of the first bitstream position P1 and the size of the second bitstream portion BS2. The second bitstream position P2 indicates a position of an end of the second bitstream portion BS2 in the bitstream segment. It should be noted that an end of the second bitstream portion BS2 is also an end of the bitstream segment.

The entropy decoding circuit 302 may perform entropy decoding upon the encoded magnitude data D2 (which include all encoded absolute values of the symbols S of the pixel group) and perform entropy decoding upon the encoded sign data D3 (which include encoded sign data of at least a portion of the symbols S of the pixel group) separately. The first bitstream position P1 calculated by the first bitstream position determining circuit 304 and the second bitstream position P2 calculated by the second bitstream position determining circuit 306 are both provided to the entropy decoding circuit 302. In this way, the entropy decoding circuit 302 may refer to the first bitstream position P1 (which indicates an end position of the first bitstream portion BS1 in the bitstream segment) to correctly separate the second bitstream portion BS2 from the first bitstream portion BS1. In addition, the entropy decoding circuit 302 can refer to the second bitstream position P2 (which indicates an end position of the second bitstream portion BS2 to quickly find a start position of a first bitstream portion of the next bitstream segment. In this way, the entropy decoding circuit 302 can be configured to perform low-latency parallel entropy decoding of multiple bitstream segments.

The aforementioned use of the first bitstream position P1 and the second bitstream position P2 is for illustrative purposes only, and is not meant to be a limitation of the present invention. In practice, any entropy decoder design using the proposed bitstream position determination scheme to calculate bitstream position(s) (e.g., P1 and/or P2) falls within the scope of the present invention.

Figure 4:
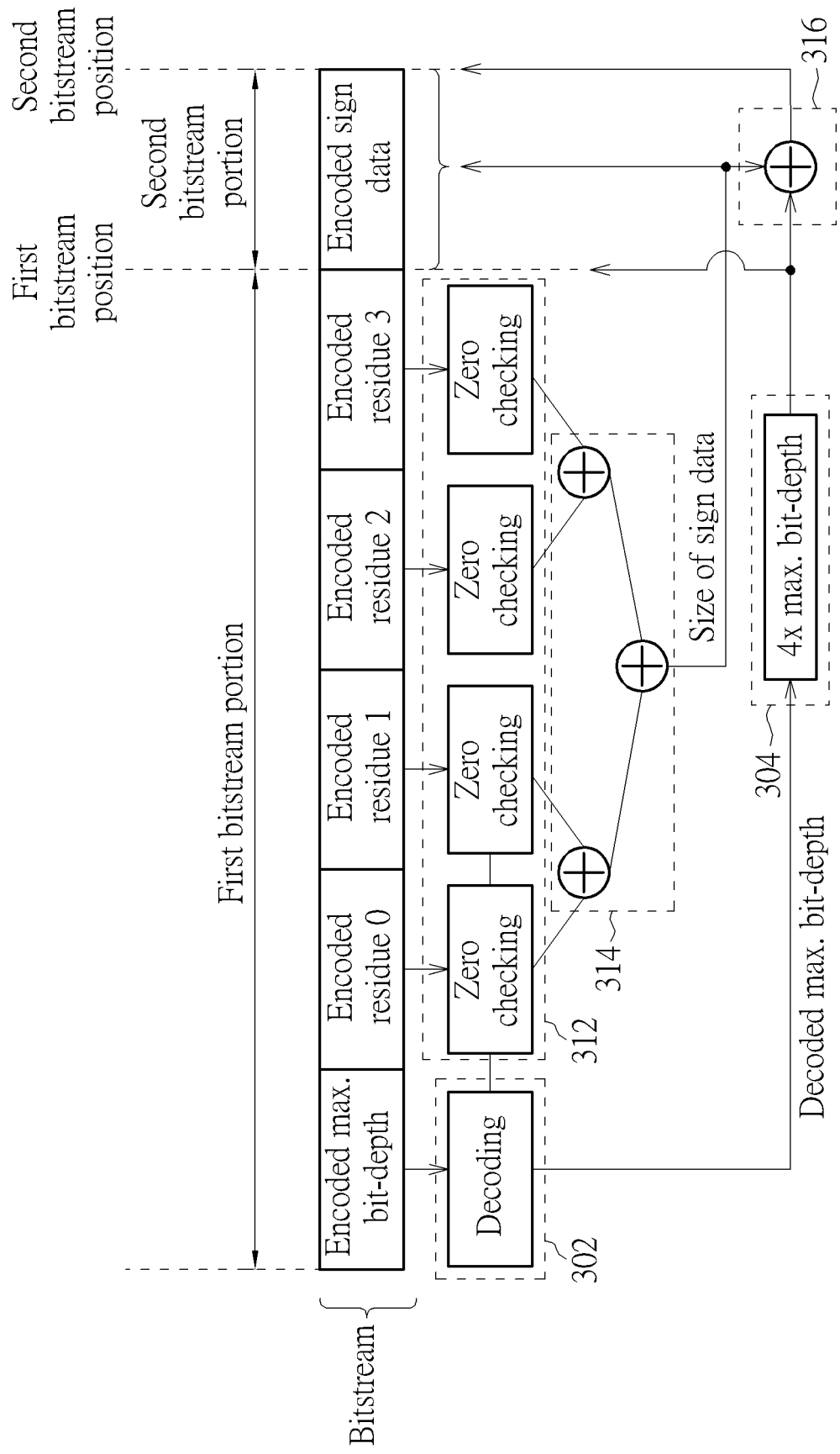
FIG. 4 is a diagram illustrating a first exemplary circuit design of a first bitstream position determining circuit, a zero checking circuit, a size determining circuit and a position calculation circuit shown in FIG. 3 according to an embodiment of the present invention.

FIG. 4 is a diagram illustrating a first exemplary circuit design of the first bitstream position determining circuit 304, the zero checking circuit 312, the size determining circuit 314 and the position calculation circuit 316 shown in FIG. 3 according to an embodiment of the present invention. In this example, one pixel group has four pixels. Hence, the encoded magnitude data of the pixel group includes four encoded magnitude values (encoded absolute values) denoted by "Encoded residue 0", "Encoded residue 1", "Encoded residue 2", "Encoded residue 3". The encoded sign data to be entropy decoded have the encoded sign value(s) of non-zero symbol value(s). The size of the encoded magnitude data of each symbol in a pixel group is constrained by the maximum bit-depth. The entropy decoding circuit 302 decodes the encoded maximum bit-depth value signaled in the first bitstream portion to generate a decoded maximum bit-depth value to the first bitstream position determining circuit 304. Hence, the first bitstream position determining circuit 304 may be implemented using a multiplier which is arranged to multiply the decoded maximum bit-depth value and the number of pixels included in the pixel group (which is equal to the number of encoded magnitude values included in the first bitstream portion). The zero checking circuit 312 may be implemented using zero checking units (denoted by "zero checking") for generating zero checking results of the encoded magnitude values (encoded absolute values). The size determining circuit 314 may be implemented using adders for summing up the zero checking results to determine the size of the second bitstream portion (which is equal to the number of non-zero symbol values). The position calculation circuit 316 may be implemented using an adder to determine the second bitstream position by summing up the size of the second bitstream portion and the first bitstream position. It should be noted that the circuit implementation shown in FIG. 4 is for illustrative purposes only, and is not meant to be a limitation of the present invention.

Figure 5:
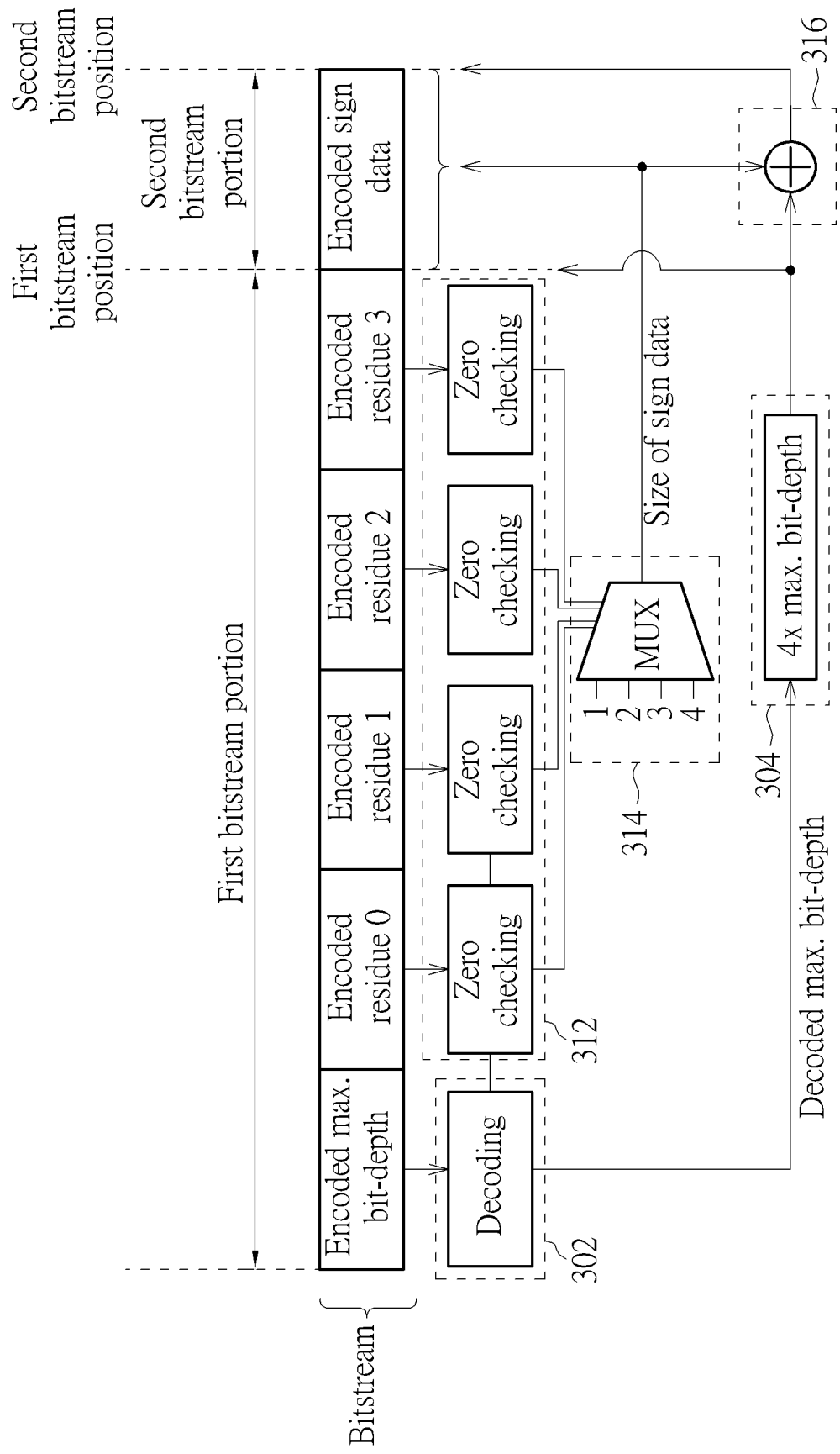
FIG. 5 is a diagram illustrating a second exemplary circuit design of the first bitstream position determining circuit, the zero checking circuit, the size determining circuit and the position calculation circuit shown in FIG. 3 according to an embodiment of the present invention.

FIG. 5 is a diagram illustrating a second exemplary circuit design of the first bitstream position determining circuit 304, the zero checking circuit 312, the size determining circuit 314 and the position calculation circuit 316 shown in FIG. 3 according to an embodiment of the present invention. The major difference between the exemplary circuit designs shown in FIG. 4 and FIG. 5 is that the size determining circuit 314 shown in FIG. 5 may be implemented using a multiplexer (MUX), wherein an output of the MUX depends on the zero checking results of the encoded magnitude values (encoded absolute values). For example, when the zero checking results include only one first value (e.g., 1), the MUX selects the value "1" as its output; when the zero checking results include only two first values (e.g., two 1's), the MUX selects the value "2" as its output; when the zero checking results include only three first values (e.g., three 1's), the MUX selects the value "3" as its output; and when the zero checking results are all first values (e.g., four 1's), the MUX selects the value "4" as its output. The size of the second bitstream portion (which is equal to the number of non-zero residue values) is set by the multiplexer output. It should be noted that the circuit implementation shown in FIG. 5 is for illustrative purposes only, and is not meant to be a limitation of the present invention.

In above exemplary entropy encoder design shown in FIG. 1 and exemplary entropy decoder design shown in FIG. 3, the first bitstream position determining circuit 104/304 is configured to do bitstream position calculation for obtaining the first bitstream position P1, and the second bitstream position determining circuit 106/306 is configured to do bitstream position calculation for obtaining the second bitstream position P2. However, these are for illustrative purposes only, and are not meant to be limitations of the present invention. In one alternative implementation, the first bitstream position determining circuit 104/304 is modified to include a size determining circuit that is configured to provide size information of the first bitstream portion BS1 to the entropy encoding circuit 102/entropy decoding circuit 302; and/or the second bitstream position determining circuit 106/306 is modified to omit at least the position calculation circuit 316, and the size determining circuit 114/314 is configured to provide size information of the second bitstream portion BS2 (or size information of the first bitstream portion BS1 and the second bitstream portion BS2) to the entropy encoding circuit 102/entropy decoding circuit 302.

When receiving the size information of the first bitstream portion BS1 and the size information of the second bitstream portion BS2 (or size information of the first bitstream portion BS1 and size information of the first bitstream portion BS1 and the second bitstream portion BS2), the entropy encoding circuit 102 may refer to the received size information to know how to correctly perform bitstream concatenation upon the first bitstream portion BS1 and the second bitstream portion BS2. When receiving the size information of the first bitstream portion BS1 and the size information of the second bitstream portion BS2 (or size information of the first bitstream portion BS1 and size information of the first bitstream portion BS1 and the second bitstream portion BS2), the entropy decoding circuit 302 may refer to the received size information to know the correct bitstream concatenation arrangement of the first bitstream portion BS1 and the second bitstream portion BS2 in the bitstream segment. For example, the size information of one bitstream portion BS1/BS2/BS1+BS2 can be obtained by arithmetic calculation. For another example, the bitstream processing is performed via a look-up table, and the size information of one bitstream portion BS1/BS2/BS1+BS2 can be obtained from the look-up table, directly or indirectly. For yet another example, the size information of one bitstream portion BS1/BS2/BS1+BS2 can be provided by using a multiplexer.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An entropy encoder comprising:
   an entropy encoding circuit, arranged to receive symbols of a pixel group, and entropy encode data derived from the symbols of the pixel group to generate a bitstream segment which is composed of a first bitstream portion and a second bitstream portion, wherein the first bitstream portion contains encoded magnitude data of the symbols of the pixel group, the second bitstream portion contains encoded sign data of at least a portion of the symbols of the pixel group, the pixel group comprises a plurality of pixels, the symbols of the pixel group have a plurality of symbol values of the pixels, respectively, at least one of the symbol values has a zero magnitude value, the first bitstream portion contains an encoded magnitude value of said at least one of the symbol values, and the second bitstream portion contains no encoded sign value of said at least one of the symbol values; and
   a size determining circuit, arranged to determine a size of a bitstream portion, wherein the bitstream portion comprises at least one of the first bitstream portion and the second bitstream portion.

2. The entropy encoder of claim 1, wherein the entropy encoder further comprises:
   a zero checking circuit, arranged to perform zero value checking upon magnitude values of the symbol values to generate a plurality of zero value checking results, respectively, wherein when a symbol value has a non-zero magnitude value, a corresponding zero value checking result is set by a first value, and when the symbol value has a zero magnitude value, the corresponding zero value checking result is set by a second value;
   wherein the bitstream portion is the second bitstream portion, and the size determining circuit determines the size of the second bitstream portion according to the zero value checking results.

3. The entropy encoder of claim 2, wherein the size determining circuit sets the size of the second bitstream portion by a number of first values included in the zero value checking results.

4. The entropy encoder of claim 1, wherein the entropy encoding circuit is further arranged to determine a bit-depth value associated with entropy encoding of the magnitude data of the symbols of the pixel group, and the entropy encoder further comprises:
   a first bitstream position determining circuit, arranged to calculate a first bitstream position according to at least the bit-depth value, wherein the first bitstream position indicates a position of an end of the first bitstream portion in the bitstream segment.

5. The entropy encoder of claim 4, wherein a bit-depth of an encoded magnitude value of each of the symbol values is equal to the bit-depth value, and the first bitstream position determining circuit calculates the first bitstream position according to at least a product of the bit-depth value and a number of the pixels included in the pixel group.

6. The entropy encoder of claim 4, further comprising:
   a second bitstream position determining circuit, comprising the size determining circuit and arranged to calculate a second bitstream position according to the first bitstream position and the size of the bitstream portion, wherein the bitstream portion is the second bitstream portion, and the second bitstream position indicates a position of an end of the second bitstream portion in the bitstream segment.

7. The entropy encoder of claim 1, further comprising:
   a bitstream position determining circuit, comprising the size determining circuit and arranged to calculate a bitstream position according to at least the size of the bitstream portion, wherein the bitstream position indicates a position of an end of the second bitstream portion in the bitstream segment.

8. The entropy encoder of claim 1, wherein the size determining circuit determines the size of the bitstream portion by using a look-up table or a multiplexer.

9. An entropy decoder comprising:
   an entropy decoding circuit, arranged to receive a bitstream segment composed of a first bitstream portion and a second bitstream portion, and entropy decode the bitstream segment to obtain decoded data of symbols of a pixel group, wherein the first bitstream portion contains encoded magnitude data of the symbols of the pixel group, the second bitstream portion contains encoded sign data of at least a portion of the symbols of the pixel group, the pixel group comprises a plurality of pixels, the symbols of the pixel group have a plurality of symbol values of the pixels, respectively, at least one of the symbol values has a zero magnitude value, the first bitstream portion contains an encoded magnitude value of said at least one of the symbol values, and the second bitstream portion contains no encoded sign value of said at least one of the symbol values; and a size determining circuit, arranged to determine a size of a bitstream portion, wherein the bitstream portion comprises at least one of the first bitstream portion and the second bitstream portion.

10. The entropy decoder of claim 9, wherein the first bitstream portion comprises encoded magnitude values of the symbol values, and the entropy decoder further comprises:

a zero checking circuit, arranged to perform zero value checking upon the encoded magnitude values of the symbol values to generate a plurality of zero value checking results, respectively, wherein when an encoded magnitude value of a symbol value has a non-zero value, a corresponding zero value checking result is set by a first value, and when the encoded magnitude value of the symbol value has a zero value, the corresponding zero value checking result is set by a second value;

wherein the bitstream portion is the second bitstream portion, and the size determining circuit determines the size of the second bitstream portion according to the zero value checking results.

11. The entropy decoder of claim 10, wherein the size determining circuit sets the size of the second bitstream portion by a number of first values included in the zero value checking results.

12. The entropy decoder of claim 9, wherein the first bitstream portion comprises an encoded bit-depth value, the entropy decoding circuit decodes the encoded bit-depth value to obtain a decoded bit-depth value associated with entropy decoding of the encoded magnitude data of the symbols of the pixel group, and the entropy decoder further comprises:

a first bitstream position determining circuit, arranged to calculate a first bitstream position according to at least the decoded bit-depth value, wherein the first bitstream position indicates a position of an end of the first bitstream portion in the bitstream segment.

13. The entropy decoder of claim 12, wherein the first bitstream portion comprises encoded magnitude values of the symbol values, a bit-depth of an encoded magnitude value of each of the symbol values is equal to the decoded bit-depth value, and the first bitstream position determining circuit calculates the first bitstream position according to at least a product of the decoded bit-depth value and a number of the pixels included in the pixel group.

14. The entropy decoder of claim 12, further comprising:

a second bitstream position determining circuit, comprising the size determining circuit and arranged to calculate a second bitstream position according to the first bitstream position and the size of the bitstream portion, wherein the bitstream portion is the second bitstream portion, and the second bitstream position indicates a position of an end of the second bitstream portion in the bitstream segment.

15. The entropy decoder of claim 9, further comprising:

a bitstream position determining circuit, comprising the size determining circuit and arranged to calculate a bitstream position according to at least the size of the bitstream portion, wherein the bitstream position indicates a position of an end of the second bitstream portion in the bitstream segment.

16. The entropy decoder of claim 9, wherein the size determining circuit determines the size of the bitstream portion by using a look-up table or a multiplexer.

17. An entropy encoding method comprising:

receiving symbols of a pixel group;

entropy encoding data derived from the symbols of the pixel group to generate a bitstream segment which is composed of a first bitstream portion and a second bitstream portion, wherein the first bitstream portion contains encoded magnitude data of the symbols of the pixel group, the second bitstream portion contains encoded sign data of at least a portion of the symbols of the pixel group, the pixel group comprises a plurality of pixels, the symbols of the pixel group have a plurality of symbol values of the pixels, respectively, at least one of the symbol values has a zero magnitude value, the first bitstream portion contains an encoded magnitude value of said at least one of the symbol values, and the second bitstream portion contains no encoded sign value of said at least one of the symbol values; and determining a size of a bitstream portion, wherein the bitstream portion comprises at least one of the first bitstream portion and the second bitstream portion.

18. The entropy encoding method of claim 17, wherein the entropy encoding method further comprises:

performing zero value checking upon magnitude values of the symbol values to generate a plurality of zero value checking results, respectively, wherein when a symbol value has a non-zero magnitude value, a corresponding zero value checking result is set by a first value, and when the symbol value has a zero magnitude value, the corresponding zero value checking result is set by a second value;

wherein the bitstream portion is the second bitstream portion, and the size of the second bitstream portion is determined according to the zero value checking results.

19. The entropy encoding method of claim 18, wherein the size of the second bitstream portion is set by a number of first values included in the zero value checking results.

20. The entropy encoding method of claim 17, further comprising:

determining a bit-depth value associated with entropy encoding of the magnitude data of the symbols of the pixel group, and calculating a first bitstream position according to at least the bit-depth value, wherein the first bitstream position indicates a position of an end of the first bitstream portion in the bitstream segment.

21. The entropy encoding method of claim 20, wherein a bit-depth of an encoded magnitude value of each of the symbol values is equal to the bit-depth value, and the first bitstream position is calculated according to at least a product of the bit-depth value and a number of the pixels included in the pixel group.

22. The entropy encoding method of claim 20, further comprising:

calculating a second bitstream position according to the first bitstream position and the size of the bitstream portion, wherein the bitstream portion is the second bitstream portion, and the second bitstream position indicates a position of an end of the second bitstream portion in the bitstream segment.

23. The entropy encoding method of claim 17, further comprising:

calculating a bitstream position according to at least the size of the bitstream portion, wherein the bitstream position indicates a position of an end of the second bitstream portion in the bitstream segment.

24. The entropy encoding method of claim 17, wherein the size of the bitstream portion is obtained by using a look-up table or a multiplexer.

25. An entropy decoding method comprising:
receiving a bitstream segment composed of a first bitstream portion and a second bitstream portion;
determining a size of a bitstream portion, wherein the bitstream portion comprises at least one of the first bitstream portion and the second bitstream portion; and
entropy decoding the bitstream segment to obtain decoded data of symbols of a pixel group;
wherein the first bitstream portion contains encoded magnitude data of the symbols of the pixel group, the second bitstream portion contains encoded sign data of at least a portion of the symbols of the pixel group, the pixel group comprises a plurality of pixels, the symbols of the pixel group have a plurality of symbol values of the pixels, respectively, at least one of the symbol values has a zero magnitude value, the first bitstream portion contains an encoded magnitude value of said at least one of the symbol values, and the second bitstream portion contains no encoded sign value of said at least one of the symbol values.

26. The entropy decoding method of claim 25, wherein the first bitstream portion comprises encoded magnitude values of the symbol values, and the entropy decoding method further comprises:
performing zero value checking upon the encoded magnitude values of the symbol values to generate a plurality of zero value checking results, respectively, wherein when an encoded magnitude value of a symbol value has a non-zero value, a corresponding zero value checking result is set by a first value, and when the encoded magnitude value of the symbol value has a zero value, the corresponding zero value checking result is set by a second value;
wherein the bitstream portion is the second bitstream portion, and the size of the second bitstream portion is determined according to the zero value checking results.

27. The entropy decoding method of claim 26, wherein the size of the second bitstream portion is set by a number of first values included in the zero value checking results.

28. The entropy decoding method of claim 25, wherein the first bitstream portion comprises an encoded bit-depth value, the encoded bit-depth value is decoded to obtain a decoded bit-depth value associated with entropy decoding of the encoded magnitude data of the symbols of the pixel group, and the entropy decoding method further comprises:
calculating a first bitstream position according to at least the decoded bit-depth value, wherein the first bitstream position indicates a position of an end of the first bitstream portion in the bitstream segment.

29. The entropy decoding method of claim 28, wherein the first bitstream portion comprises encoded magnitude values of the symbol values, a bit-depth of an encoded magnitude value of each of the symbol values is equal to the decoded bit-depth value, and the first bitstream position is calculated according to at least a product of the decoded bit-depth value and a number of the pixels included in the pixel group.

30. The entropy decoding method of claim 28, further comprising:
calculating a second bitstream position according to the first bitstream position and the size of the bitstream portion, wherein the bitstream portion is the second bitstream portion, and the second bitstream position indicates a position of an end of the second bitstream portion in the bitstream segment.

31. The entropy decoding method of claim 25, further comprising:
calculating a bitstream position according to at least the size of the bitstream portion, wherein the bitstream position indicates a position of an end of the second bitstream portion in the bitstream segment.

32. The entropy decoding method of claim 25, wherein the size of the bitstream portion is obtained by using a look-up table or a multiplexer.

* * * * *